March 7, 1939.　　　　G. J. UHLIG　　　　2,149,371
CONTROL MECHANISM
Filed Aug. 17, 1936　　　　4 Sheets-Sheet 1
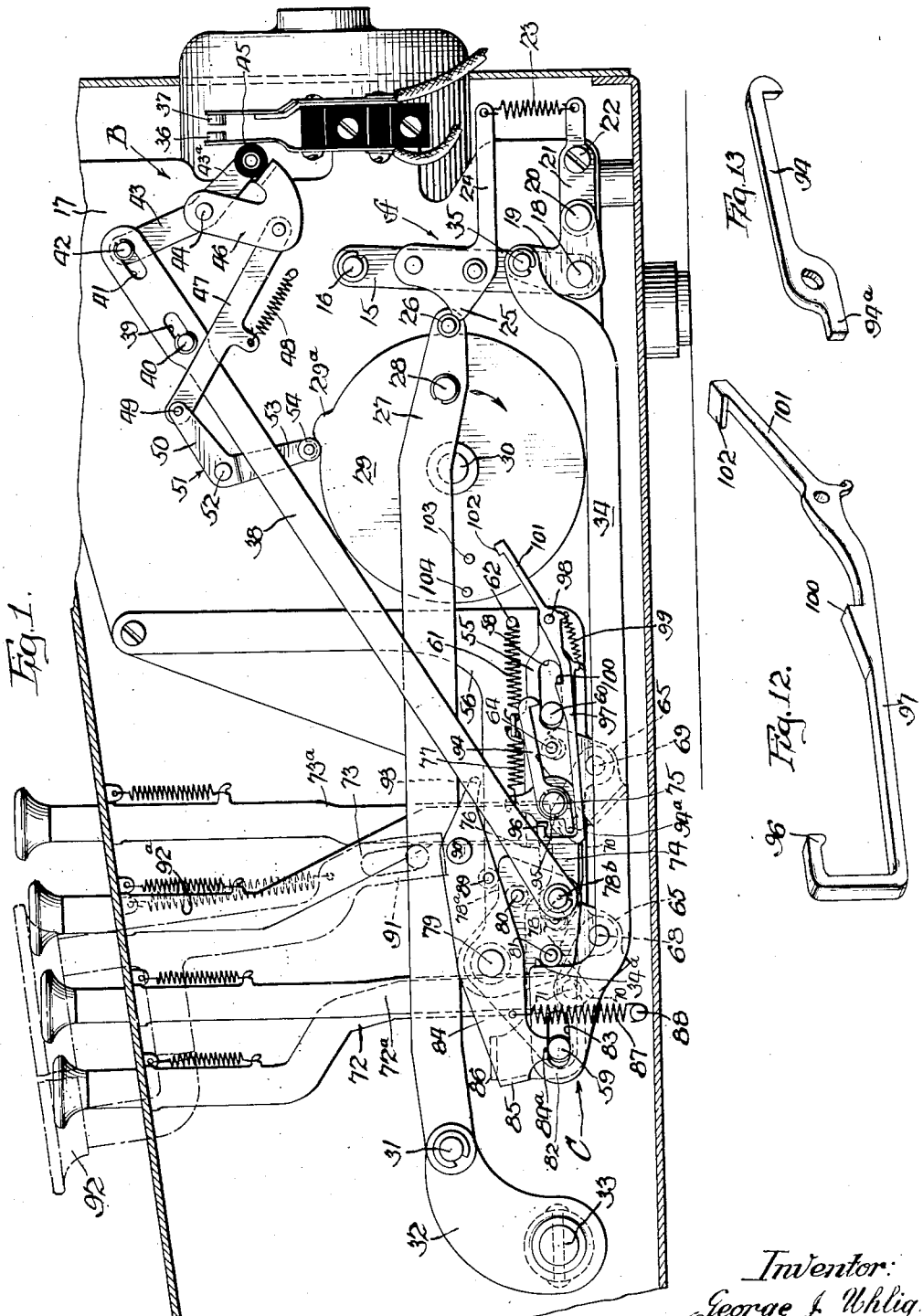
Inventor:
George J. Uhlig
Witness:
E. Campouri
Attorney

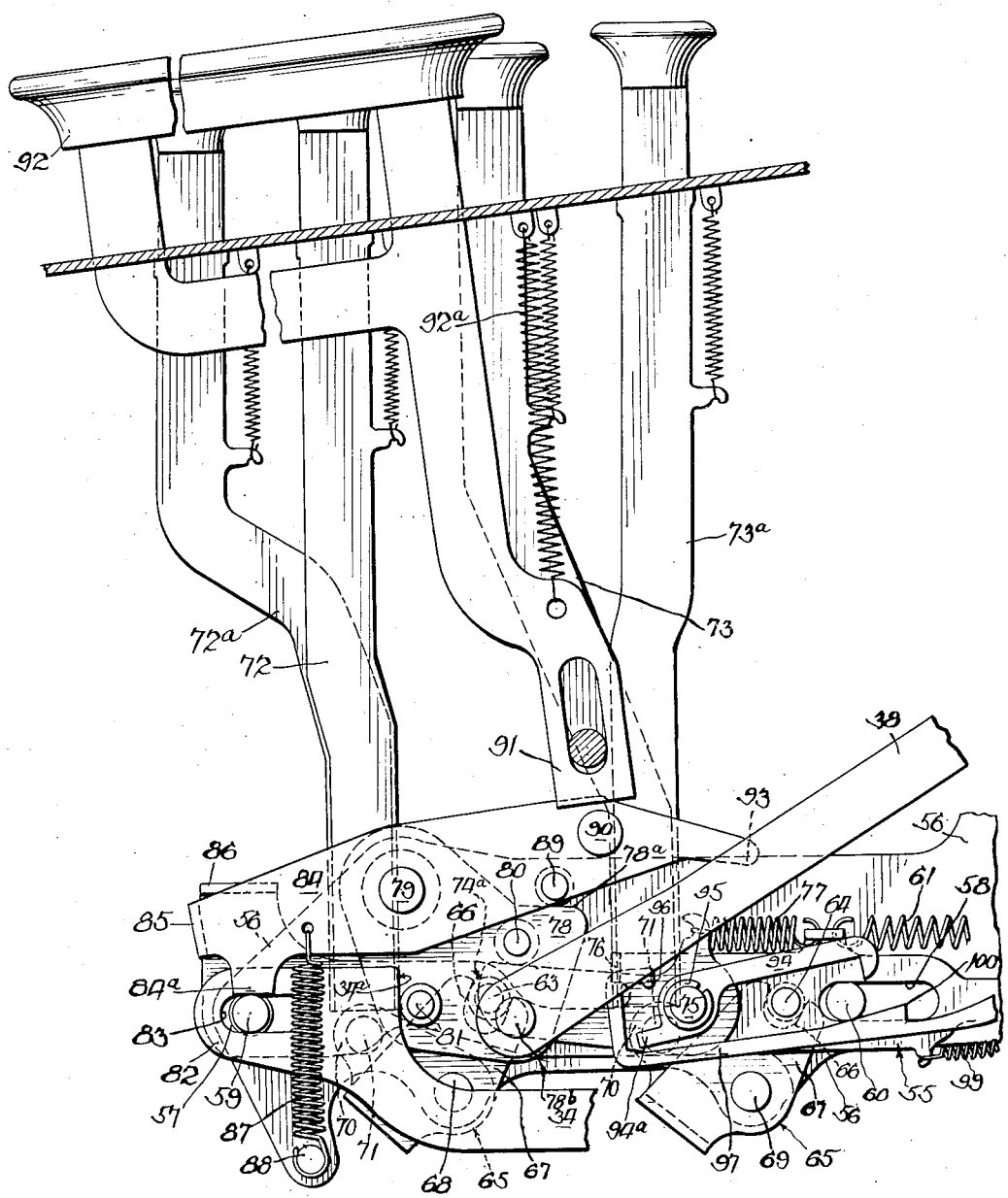

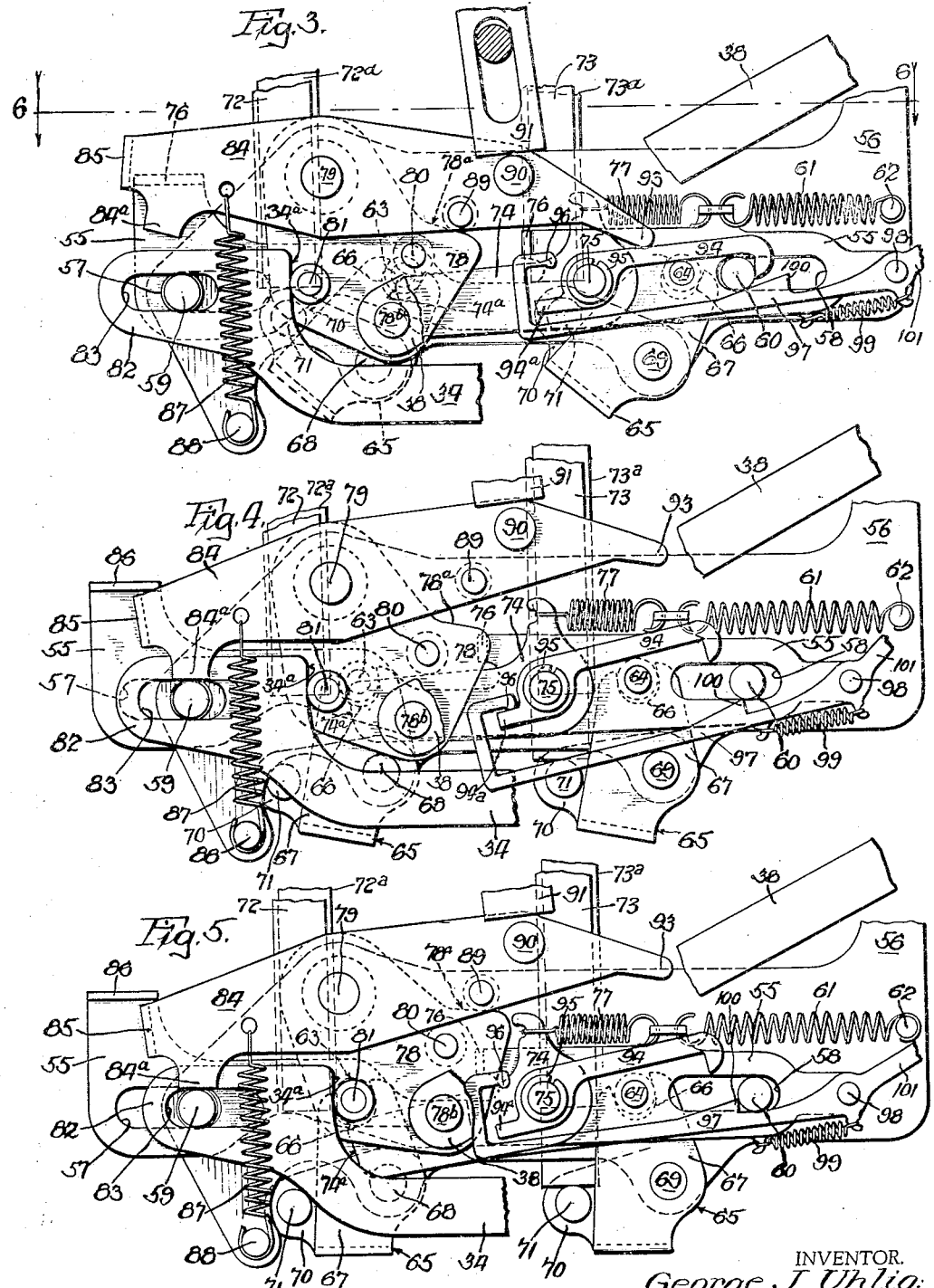

March 7, 1939.  G. J. UHLIG  2,149,371
CONTROL MECHANISM
Filed Aug. 17, 1936  4 Sheets-Sheet 4
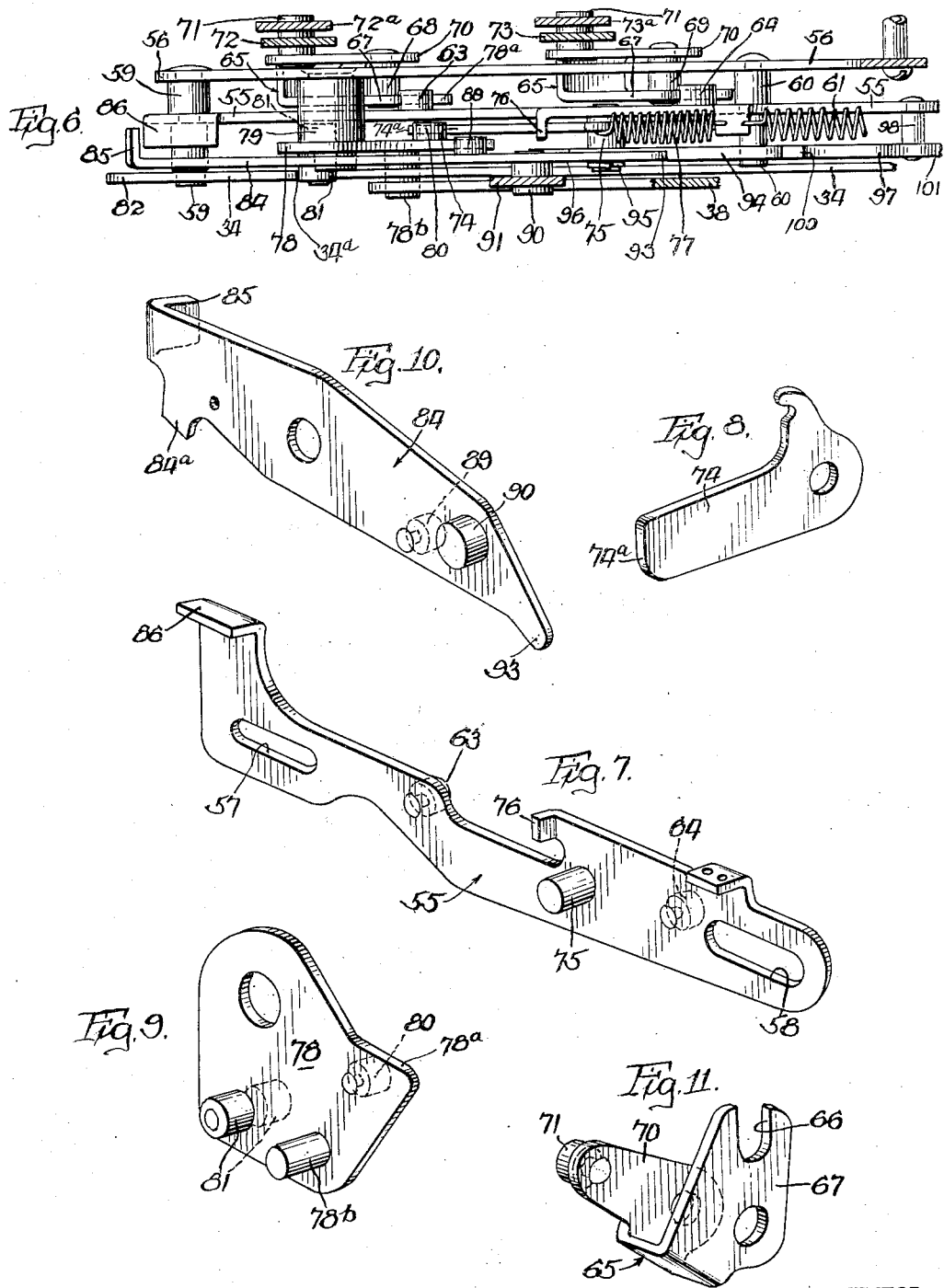

Patented Mar. 7, 1939

2,149,371

UNITED STATES PATENT OFFICE 2,149,371

CONTROL MECHANISM

George J. Uhlig, Chicago, Ill., assignor to Victor Adding Machine Company, Chicago, Ill., a corporation of Illinois Application August 17, 1936, Serial No. 96,495

11 Claims. (Cl. 235—62)

The present invention relates to a control mechanism, and is more particularly adapted to be operated by the control keys and a motor bar of an adding or calculating machine for effecting the connection of the machine with its source of power, and which mechanism is automatically released at a predetermined interval of operation of the machine.

The mechanism is illustrated as being attached to an adding machine in which a single revolution or cycle is required for the setting up and operation of the parts and restoring them to their normal positions. The control mechanism is operable by the control keys and a motor bar, any one of which, when depressed, will condition the control mechanism for effecting the connection of the machine with its source of power and the depressed key or bar may be released to normal position while the control mechanism remains in operative position during the cycle of operation of the machine.

The invention is shown applied to a machine having connections of the type illustrated and described in applicant's Patent No. 2,017,641, granted October 15, 1935.

It sometimes occurs, in key-set machines of the type disclosed in the above-mentioned patent, that when a selected control key has been depressed to condition the machine for an operation, another key is accidentally depressed during the operation of the machine, and it will effect an error in the result, or cause the unselected key to condition the machine.

It is, therefore, an object of the present invention to provide an improved, simplified control mechanism operable upon the depression of a control key or motor bar, which will effect its movement and the positioning of the operative connections for a cycle of operation of the machine and wherein the keys may be instantly released, while the control mechanism remains in the position to which it has been moved until the operation of the machine is completed, and at which time, the control mechanism is released to normal position.

A further object is to provide means coacting with the control mechanism whereby, upon the depression of a selected control key or motor bar, the mechanism will be conditioned for a cycle of operation of the machine, and thereafter the accidental depression of any of the remaining keys will not alter the condition of the control mechanism.

And a further object is to provide a control mechanism, which, when actuated by a control key or motor bar, will be conditioned to lock the same against movement with any of the remaining keys, until the completion of operation of the machine, and at which time, the control mechanism will be automatically released and restored to its normal position.

With these and incidental objects in view, the invention consists in certain novel features of construction and combinations of parts, the essential elements of which are set forth in the appended claims, and a preferred form of embodiment of which is hereinafter described with reference to the drawings which accompany and form part of this specification.

Referring to the drawings:

Figure 1 is a side elevation, illustrating my device as attached to an adding machine, showing the casing of the machine in section and the connections extending from the device to operate the machine.

Figure 2 is an enlarged partial detail side elevation of the machine, illustrating the connections, control key and motor bar operatively connected with the control mechanism.

Figure 3 is an enlarged side view in elevation of the control mechanism, illustrating its position with the motor bar depressed.

Figure 4 is a view in side elevation, illustrating the position of the control mechanism when a control key has been depressed to nearly its entire distance.

Figure 5 is a view in side elevation, illustrating the position of the control mechanism when a control key has been depressed its entire distance.

Figure 6 is a top plan view of the control mechanism taken on the line 6—6 of Figure 3.

Figure 7 is a detail perspective view of the main slide.

Figure 8 is a detail perspective view of the dog or pawl carried on the main slide.

Figure 9 is a detail perspective view of the bell-crank for effecting movement of the dog or pawl and the operative connections of the machine with its source of power.

Figure 10 is a detail perspective view of the rockable member for effecting movement of the bell-crank and locking the main slide when the motor bar is depressed.

Figure 11 is a detail perspective view of one of the bell-cranks that are connected to the main slide for effecting its movement upon the depression of a control key.

Figure 12 is a detail perspective view of one of the locks carried on the main slide for retaining the same in operative position when a control key has been depressed; and Figure 13 is a detail perspective view of the lock for retaining the main slide in normal position when the motor bar is depressed.

The operable connections to which the invention is applied, comprise a tripping mechanism A and a control switch B, adapted to be simultaneously actuated. The tripping mechanism A comprises a depending link 15 pivotally carried on a stud 16 fixed to the side plate 17 of the machine, and has its lower end provided with a pin 18 on which a bell-crank 19 is pivotally carried and which has a pin 20 fixed in one of its legs to which a link 21 is connected, and which link is pivotally carried on the side plate 17 by means of a shoulder screw 22. The link 21 and the bell-crank 19 form a toggle joint and are urged to the position shown in Fig. 1, by means of a spring 23 secured to the link 21 and to an arm 24 fixed to the depending link 15. This arm 24 is provided with an extending portion 25 that is in the path of a follower 26 carried on the link 27, which is pivoted on a stud 28 extending from a disc 29 that is fixed to the shaft 30 of a driving mechanism of the machine. This link 27 extends forwardly and is pivoted to a stud 31 carried on a lever 32 fixed to the actuator shaft 33 of the machine. The toggle connection of the tripping mechanism A comprises the bell-crank 19 and link 21, and is operatively connected to a link 34 which extends to the control mechanism C, and which link is pivotally connected at 35 to the bell-crank 19.

The control switch B comprises a pair of contact points 36 and 37, which are adapted to be forced into closed position upon one direction of movement of a link 38, which is also operatively connected to the control mechanism C. This link 38 is provided with an elongated slot opening 39 through which a pin 40 fixed to the side plate 17, extends to guide the link, and the free end of this link is also provided with an elongated slot opening 41 to receive a pin 42 on an arm 43 pivotally carried on a stud 44 fixed to the side plate 17. The free end 43a of the arm 43 carries an insulated roller 45 which is adapted to engage the contact point 36 to effect its engagement with the contact point 37 to close the circuit. When the circuit is closed, an arm 46 which is also pivoted on the stud 44, will be urged counter-clockwise by a link 47 which has a spring 48 fixed thereto and to the side plate 17. The link 47 is connected at 49 to one leg 50 of a bell-crank 51 that is pivotally carried on a stud 52 fixed to the side plate 17, and which bell-crank has its other leg 53 provided with a follower 54 that is adapted to normally ride on the periphery of the disc 29. This disc 29 is also provided with a cam portion 29a, which, upon the completion of operation of the machine, will engage the follower 54 and effect a pull on the link 47 to carry the arm 46 away from the insulated roller 45 to break the circuit.

The link 34 is adapted to be pulled forwardly to actuate the tripping mechanism A and break the toggle joint, and when broken, the depending link 15 will be swung rearwardly with the extension 25 of the arm 24, out of the path of the follower 26 to permit the link 27 to be driven with the disc 29.

The tripping mechanism and the control switch have been fully illustrated and described in my Patent No. 2,017,641, granted October 15, 1935, and it is to the operative connections thereof that my improved device is attached.

The control mechanism C forming the subject matter of this application, comprises a main slide 55 carried for reciprocating movements on a plate 56 secured to the side plate 17 of the machine. The main slide 55 is provided with elongated slot openings 57 and 58 adjacent each end thereof through which the studs 59 and 60, respectively, extend to guide the same. The main slide 55 is urged rearwardly to normal position, (to the right as viewed in Figs. 1, 2, 3, 4 and 5), by means of a spring 61 fixed thereto and to a pin 62 carried on the plate 56. The main slide 55 also carries a pair of studs 63 and 64 to each of which studs a bell-crank 65—65 is operatively connected by means of a bifurcated opening 66—66 in the upper end of the legs 67—67 of the bell-cranks. These bell-cranks 65—65 are carried on the studs 68—69 fixed to the plate 56, and are of U-formation, having their other leg 70—70 disposed on the inner side of the plate 56 and provided with an inwardly directed pin 71—71 adapted to be engaged by a pair of control keys 72—72a and 73—73a, respectively.

The main slide 55 also carries a dog or pawl 74 which is pivoted to a stud 75 thereon, and which dog or pawl is urged against an ear 76 on the slide by means of a spring 77 fixed thereto and to the slide.

A bell-crank 78 is mounted independently of the main slide 55 on a stud 79 extending from the plate 56 and this bell-crank carries a pin 80 which is normally adapted to overlie the dog or pawl 74, to depress the same as the bell-crank is rocked. The bell-crank 78 also carries a pin 81 which extends outwardly on each side thereof and which pin is adapted to engage a shoulder 34a on the link 34. The pin 81 is also adapted to be engaged by the end 74a of the pawl 74, when the slide 55 is moved. The link 34 has its free end portion 82 provided with an elongated slot opening 83 that receives the stud 59, which serves to support and guide the link 34 readily engageable by the pin 81 on the bell-crank 78. The bell-crank 78 also carries a pin 78b to which the link 38 of the control switch B is operatively connected.

A rocker 84 is also pivoted on the stud 79 and is provided with an inturned vertically disposed ear 85 at its forward end portion which is normally below a horizontally disposed ear 86 formed at the forward end of the main slide 55. The rocker 84 is normally urged with an extension 84a thereof into engagement with the stud 59 by means of a spring 87 fixed thereto and to a pin 88 carried on the plate 56. The rearward end of the rocker carries a pin 89 which normally overlies an edge 78a of the bell-crank 78 for effecting its movement upon the movement of the rocker 84. The rocker also carries a stud 90 which is adapted to be engaged by the stem 91 of a motor bar 92, which effects movement of the rocker 84 when depressed. The rocker 84 also has an extension 93 which is adapted to engage and move a hook member 94 to retain the main slide 55 in its normal at-rest position when the rocker 84 is rocked.

The hook member 94 is pivoted on the stud 75 adjacent the pawl 74, and has a friction washer 95 coacting therewith to retain the same in the position to which it has been moved. The hook member 94 is provided with an extension 94a that is in the path of movement of an extension 96 of a pawl 97 which is pivoted on a pin 98 carried on the main slide 55. The pawl 97 has a spring 99 fixed thereto and to the main slide 55, which yieldingly urges the engaging end 100 of the pawl readily engageable with the stud 60, when the slide 55 is moved, (Fig. 5). The pawl 97 is also provided with an extension 101 which has an inturned end 102 thereon adapted to normally extend into the path of either of the pins 103 or 104 carried on the disc 29. The pin 103 is adapted to engage the inturned end 102 of the pawl 97 when the main slide 55 is in normal position, and the pin 104 is adapted to engage the inturned end 102 when the main slide 55 is moved to operative position.

As thus far described, it will be seen that the main slide 55 is moved forwardly or to the left, as viewed in the drawings, upon the depression of one of the control keys 72—72a or 73—73a. When depressed, the lower end of the selected control key will engage a stud 71 of one of the bell-cranks 65 and effect its rocking movement on its stud 68 or 69, and by reason of its connection 63—66 or 64—66 will effect a forward sliding movement of the main slide 55 against the tension of its spring 61. The forward movement of the slide 55 will carry the dog or pawl 74 therewith for a partial free movement before the end 74a thereof engages the pin 81 on the bell-crank 78, which permits of nearly a full depression of the key, and when engaged, the dog or pawl 74 will cause a rocking movement of this bell-crank, and by reason of the pin 81 also engaging the shoulder 34a of the link 34, the link will be carried therewith to release the tripping mechanism A. This movement of the bell-crank 78 will exert a pull on the link 38 to effect a rocking movement of the arm 43 with the roller 45 thereon to operate the control switch B and close the contact points 36—37 to complete the circuit. While the bell-crank 78 is being rocked during the forward movement of the main slide 55, the pin 80 will engage the dog 74 and gradually depress the same, (Fig. 4), until the main slide has been moved to nearly its entire distance and at which time, the end 74a of the dog 74 will be forced by the pin 80 out of engagement with the pin 81 to release the bell-crank, (Fig. 5). When released, the bell-crank will be free to be restored to its normal position under the influence of the spring 23 which urges the tripping mechanism A to its normal position immediately after it has been released, to again position the extending portion 25 into the path of the follower 26 on the link 27 to be engaged thereby upon the completion of its operation with the disc 29. The restoring movement of the bell-crank 78 also restores the link 38, which is permitted to move at this time independently of the arm 43, so as to retain the control switch A closed, and as the cam 29a on the periphery of the disc 29 engages the follower 54 to rock the bell-crank 51, it will exert a pull on the link 47 and rock the arm 46 therewith to relieve the pressure thereof against the roller 45 to break the circuit.

When the main slide 55 has been moved forwardly its entire distance, (Fig. 5), the engaging end 100 of the lock pawl 97 will engage the stud 60 and retain the main slide 55 locked in its advanced forward position until the pin 104 on the disc 29 has engaged the inturned end 102 on the extension 101 of the pawl to release the same. The purpose for retaining the slide locked in its forward position, is to retain the bell-cranks 65 coacting therewith, in rocked position with the studs 71 thereon in their lowermost positions, so that, should a control key be accidentally depressed after a selected control key has positioned the main slide, it will not alter the operation of the machine.

It will also be noted that when the main slide 55 is moved to this forward position by a selected control key, the ear 86 of the slide will be positioned over the ear 85 of the rocker 84, and lock the rocker against movement under the control of the motor bar 92.

When the machine is conditioned for normal operations and the motor bar 92 is depressed, the end 91 thereof will engage the stud 90 on the rocker 84 and rock the same with the ear 85 thereof in the path of the ear 86 on the main slide 55, (Fig. 3), to lock the slide against movement. The pin 89 of the rocker 84 will engage the top edge 78a of the bell-crank 78 to rock the same and the pin 81 thereon will engage the shoulder 34a of the link 34 and exert a pull thereon to release the tripping mechanism A, and this movement of the bell-crank 78 will also exert a pull on the link 38 to close the control switch in the same manner as above described. While the bell-crank 78 is being moved under the control of the rocker 84, the pin 80 on the bell-crank will depress the pawl 74, but in this instance, the pawl has no function.

As the pressure is released from the motor bar 92, a spring 92a fixed thereto and to the top plate of the machine, will restore the same with its stem and permit the rocker to be instantly urged to its normal position by its spring 87 to release the bell-crank 78. When released, the bell-crank 78 will be urged to its normal position by the link 34 connected thereto, in the same manner as above described, when a control key is depressed. As the rocker 84 is rocked upon the depression of the motor bar 92, the end 93 of the rocker will engage the hook member 94, (Fig. 3), and cause the same to engage the stud 60 to positively retain the slide 55 against accidental movement.

It will be noted that when the pressure is released from the motor bar 92, the rocker 84 will be instantly restored by its spring 87 to normal position and the ear 85 of the rocker will be carried out of the path of the ear 86 of the main slide 55, and the hook member 94 serves to retain the main slide locked during the operation of the machine and after the motor bar and rocker have been restored to their normal positions. In this instance, the pin 103 on the disc 29 will be carried to engage the inturned end 102 of the extension 101 on the pawl 97, and will rock the same until the extension 96 of the pawl engages the end 94a of the hook member 94 to rock this hook member out of engagement with the stud 60 to release the slide 55. The hook member 94 will remain in this raised position by means of the friction washer 95 engaging the same.

When the main slide 55 is locked against operation by means of the hook member 94, the studs 71—71 of the bell-cranks 65—65 are retained readily engageable by the control keys 72—72a and 73—73a, but are locked from movement by the main slide, and it is then impossible to depress a control key. When the main slide is locked in its advanced position by the pawl 97, the studs 71—71 of the bell-cranks 65—65 are retained thereby in lowered positions, and the depression of a key is possible, but it will not effect the movement of the main slide.

The pawl 97 is normally urged upwardly by the spring 99 with the engaging end 100 thereof readily engageable with the stud 60 when the main slide 55 is moved forwardly.

While the form of mechanism herein shown and described is admirably adapted to fulfill the objects primarily stated, it is to be understood that it is not intended to confine the invention to the one form of embodiment herein shown and described, as it is susceptible of embodiment in various forms, all coming within the scope of the claims which follow.

I claim:

1. A control mechanism of the character described, comprising, a slide carried for reciprocating movements, a bell-crank adapted to be moved by said slide, a rockable member adapted to move said bell-crank independently of said slide, operative connections arranged for movement with said bell-crank, and depressible means operatively connected to the slide and rockable member for effecting independent movements thereof, and means on said slide and rockable member rendering one inoperative during the movements of the other.

2. A control mechanism of the character described, comprising, a slide carried for reciprocating movements and having spring means normally urging the same in one direction, a bell-crank operatively connected to said slide, a rockable member operatively connected with the bell-crank to move the same independently of said slide, a pair of lock means on the slide for locking the same against movement and for retaining the same in its moved position, and means on said rockable member adapted to effect movement of the lock means for retaining the slide in its normal position when said rockable member is moved to move the bell-crank.

3. A control mechanism for a machine having operative connections and a control switch adapted to be controlled thereby comprising, a reciprocable slide, yieldable means urging the slide in one direction, a spring-urged pawl mounted on said slide, a bell-crank mounted in close proximity with the slide and adapted to be moved by said pawl, said operative connections being actuated by movement of the bell-crank, and depressible means operative upon depression to move said slide to move the bell-crank.

4. A device of the character described, comprising in combination, a swingable member, a pair of members comprising a slide and rocker for effecting movement of said swingable member, the said swingable member adapted to be permanently connected to the parts of a machine to be actuated and selectively controlled by said pair of members, manipulative devices, said pair of members being arranged to selectively effect movement of the swingable member under the control of the manipulative devices, and means on the pair of members whereby the slide of said pair of members when moved locks the rocker against movement and the rocker of said pair of members when moved locks the slide against movement.

5. The combination of claim 4 hereof in which there are lock means carried on one of said pair of members for locking the same in the position to which it has been moved and controlled by the other of said pair of members for withholding movement of said first member.

6. In a machine having operative connections for connecting the machine with its source of power, a swingable member connected to said operative connections, a reciprocable member, a rockable member, said reciprocable and rockable members being operatively connected to said swingable member, manipulative keys and a motor bar controlling the movements of said reciprocable and rockable members respectively to move the swingable member, means operable by movement of said rockable member withholding the reciprocable member from movement and rendering said manipulative keys ineffective during the connection of the machine with its source of power.

7. In a machine of the character described, the combination with connections for connecting the machine with its source of power, of a control mechanism therefor, said control mechanism comprising a member connected with said connections, a pair of members adapted to selectively move the same, a plurality of control keys, a motor bar, one of said pair of members being under the control of the control keys and the other of said members being under the control of the motor bar for effecting movement of said first-mentioned member, and lock means operatively controlled by said members for retaining one of the members of the control mechanism locked with the operative connections of the machine until a cycle of operation thereof has been substantially completed.

8. In a machine having operative connections for connecting the same with its source of power, a control mechanism operatively connected to said connections, manipulative devices for actuating the control mechanism, said control mechanism comprising a swingable member connected to said connections, a reciprocating member and a rockable member operatively connected to effect movement of said swingable member under control of said manipulative devices, said reciprocating and rockable members being arranged for independent movements under the control of the manipulative devices to swing the swingable member and for rendering one inoperative by movement of the other.

9. The combination of claim 8 hereof in which there are lock means on said reciprocable member, one of said lock means being controlled by movement of said reciprocable member and the other of said lock means being controlled by movement of the rockable member whereby to lock the reciprocable member in either direction of its movement, said lock means being operatively connected together and with the machine for releasing the lock means to release the reciprocable member substantially upon the completion of operation of the machine.

10. A control mechanism of the character described, comprising, a member operatively connected to the parts to be controlled, a reciprocable member, a rockable member, said members being operatively connected to move said first-mentioned member independently of each other, and means on the reciprocable member forming means to engage and move said first-mentioned member and to be disengaged thereby upon a given distance of its movement.

11. A control mechanism for a machine having a tripping mechanism and a control switch therefor comprising, a main member carried for reciprocating movements, a swingable member adapted to be swung thereby, a rocker adapted to swing said swingable member, and lock means coacting with the reciprocating member for locking the same when moved and lock means for locking said reciprocating member while in its normal position, said first-mentioned lock means being rendered effective by movement of the reciprocating member and said last-mentioned lock means being rendered effective by movement of said rocker, said lock means being releasable substantially upon the completion of operation of the machine.

GEORGE J. UHLIG.